(12) United States Patent
Kim et al.

(10) Patent No.: US 11,481,912 B2
(45) Date of Patent: Oct. 25, 2022

(54) DEVICE FOR GENERATING A DEPTH MAP

(71) Applicants: SK hynix Inc., Icheon (KR); Korea Advanced Institute of Science and Technology (KAIST), Daejeon (KR)

(72) Inventors: Doyeon Kim, Daejeon (KR); Sihaeng Lee, Daejeon (KR); Janghyeon Lee, Daejeon (KR); Minki Jo, Andong (KR); Junmo Kim, Seoul (KR)

(73) Assignees: SK hynix Inc., Icheon (KR); Korea Advanced Institute of Science and Technology (KAIST), Daejeon (KR)

( * ) Notice: Subject to any disclaimer, the term of this patent is extended or adjusted under 35 U.S.C. 154(b) by 148 days.

(21) Appl. No.: 17/169,092

(22) Filed: Feb. 5, 2021

(65) Prior Publication Data
US 2022/0028096 A1 Jan. 27, 2022

(30) Foreign Application Priority Data
Jul. 24, 2020 (KR) .................. 10-2020-0092085

(51) Int. Cl.
*G06K 9/62* (2022.01)
*G06T 7/50* (2017.01)
(52) U.S. Cl.
CPC ...... *G06T 7/50* (2017.01); *G06T 2207/20084* (2013.01)
(58) Field of Classification Search
CPC .......................................... G06T 7/50
See application file for complete search history.

(56) References Cited

U.S. PATENT DOCUMENTS

2019/0279383 A1* 9/2019 Angelova .................. G06T 3/40
2019/0332942 A1* 10/2019 Wang ....................... G06F 17/16

FOREIGN PATENT DOCUMENTS

CN 108520535 A * 9/2018 ............. G06K 9/629

OTHER PUBLICATIONS

Detail Preserving Depth Estimation from—Networks, Zhixiang Hao et al., IEEE, 2018, pp. 304-313 (Year: 2018).*
Bottleneck Attention Module, Jongchan Park et al., KAIST, 2018, pp. 1-14 (Year: 2018).*
Neural Information Bottleneck Decoding, Maximilian Stark et al., IEEE, 2020, pp. 1-7 (Year: 2020).*
Transformable Bottleneck Networks, Kyle Olszewski et al., CVF, 2019, pp. 7648-7657 (Year: 2019).*
Amlaan Bhoi, "Monocular Depth Estimation: A Survey", Jan. 27, 2019, arXiv:1901.09402v1.
Junjie Hu et al, "Visualization of Convolutional Neural Networks for Monocular Depth Estimation", in Proceedings of the IEEE International Conference on Computer Vision, Apr. 6, 2019, pp. 3869-3878, arXiv:1904.03380v1.

(Continued)

*Primary Examiner* — Jayesh A Patel

(57) ABSTRACT

A device includes an encoder configured to generate a plurality of feature data by encoding an image; a bottleneck circuit configured to generate enhanced feature data from first bottleneck data among the plurality of feature data; and a decoder configured to generate a depth map corresponding to the image by decoding the enhanced feature data and the plurality of feature data except the first bottleneck data.

20 Claims, 7 Drawing Sheets

(56) References Cited

OTHER PUBLICATIONS

Huan Fu et al., "Deep Ordinal Regression Network for Monocular Depth Estimation", in Proceedings of the IEEE Conference on Computer Vision and Pattern Recognition, Jan. 6, 2018, pp. 2002-2011, arXiv:1806.02446v1.

Wei Yin et al., "Enforcing geometric constraints of virtual normal for depth prediction", in Proceedings of the IEEE International Conference on Computer Vision, 2019, pp. 5684-5693.

Y. Gan et al. ,"Monocular depth estimation with affinity, vertical pooling, and label enhancement", in Proceedings of the European Conference on Computer Vision (ECCV), 2018, pp. 224-239.

X. Guo et al., "Learning monocular depth by distilling cross-domain stereo networks", in Proceedings of the European Conference on Computer Vision (ECCV), 2018, pp. 484-500.

D. Eigen et al., "Depth map prediction from a single image using a multi-scale deep network", in Advances in neural information processing systems (NIPS), 2014, pp. 2366-2374.

R. Garg et al., "Unsupervised cnn for single view depth estimation: Geometry to the rescue", in Proceedings of the European Conference on Computer Vision (ECCV). Springer, 2016, pp. 740-756.

M. Ochs et al., "Sdnet: Semantically guided depth estimation network," in German Conference on Pattern Recognition, 2019, pp. 288-302, Springer.

O. Ronneberger et al, "U-net: Convolutional networks for biomedical image segmentation," in International Conference on Medical image computing and computer-assisted intervention, 2015, pp. 234-241, Springer.

P. Wang te al., "Towards unified depth and semantic prediction from a single image," in Proceedings of the IEEE Conference on Computer Vision and Pattern Recognition, 2015, pp. 2800-2809.

I. Laina et al., "Deeper depth prediction with fully convolutional residual networks," in 2016 Fourth international conference on 3D vision (3DV), 2016, pp. 239-248, IEEE.

C. Godard et al., "Unsupervised monocular depth estimation with left-right consistency," in Proceedings of the IEEE Conference on Computer Vision and Pattern Recognition (CVPR), 2017, pp. 270-279.

Y. Kuznietsov et al, "Semi-supervised deep learning for monocular depth map prediction," in Proceedings of the IEEE Conference on Computer Vision and Pattern Recognition (CVPR), 2017, pp. 6647-6655.

J. Li et al, "A two-streamed network for estimating fine scaled depth maps from single rgb images," in Proceedings of the IEEE International Conference on Computer Vision, 2017, pp. 3372-3380.

X. Qi et al., "Geonet: Geometric neural network for joint depth and surface normal estimation," in Proceedings of the IEEE Conference on Computer Vision and Pattern Recognition, 2018, pp. 283-291.

J. Hu et al., "Revisiting single image depth estimation: Toward higher resolution maps with accurate object boundaries," in 2019 IEEE Winter Conference on Applications of Computer Vision (WACV), 2019, pp. 1043-1051, IEEE.

Z. Zhang et al., "Pattern-affinitive propagation across depth, surface normal and semantic segmentation," in Proceedings of the IEEE Conference on Computer Vision and Pattern Recognition, 2019, pp. 4106-4115.

F. Liu et al., "Learning depth from single monocular images using deep convolutional neural fields," IEEE transactions on pattern analysis and machine intelligence, 2015, vol. 38, No. 10, pp. 2024-2039.

J. Jiao et al., "Look deeper into depth: Monocular depth estimation with semantic booster and attention-driven loss," in Proceedings of the European Conference on Computer Vision (ECCV), 2018, pp. 53-69.

H. A. Amirkolaee and H. Arefi, "Monocular depth estimation with geometrical guidance using a multi-level convolutional neural network," Applied Soft Computing, 2019, vol. 84, 105714.

Po-Yi Chen et al., "Towards scene understanding: Unsupervised monocular depth estimation with semantic-aware representation," in Proceedings of the IEEE Conference on Computer Vision and Pattern Recognition, 2019, pp. 2624-2632.

D. Xu et al., "Structured attention guided convolutional neural fields for monocular depth estimation," in Proceedings of the IEEE Conference on Computer Vision and Pattern Recognition, 2018, pp. 3917-3925.

Y. Chen et al., "Attention-based context aggregation network for monocular depth estimation," arXiv preprint arXiv:1901.10137, 2019.

K. Takagi et al., "Boosting monocular depth estimation with channel attention and mutual learning," in 2019 Joint 8th International Conference on Informatics, Electronics & Vision (ICIEV) and 2019 3rd International Conference on Imaging, Vision & Pattern Recognition (icIVPR), 2019, pp. 228-233, IEEE.

J. Hu et al., "Squeeze-and-excitation networks," in Proceedings of the IEEE conference on computer vision and pattern recognition, 2018, pp. 7132-7141.

J. Deng et al., "Imagenet: A large-scale hierarchical image database," in 2009 IEEE conference on computer vision and pattern recognition, 2009, pp. 248-255, IEEE.

J. Park et al, "Bam: Bottleneck attention module," arXiv preprint arXiv:1807.06514, 2018.

S. Woo et al., "Cbam: Convolutional block attention module," in Proceedings of the European Conference on Computer Vision (ECCV), 2018, pp. 3-19.

A. Saxena et al., "Depth estimation using monocular and stereo cues", 2007.

K. Chatfield et al., "Return of the devil in the details: Delving deep into convolutional nets," arXiv preprint arXiv:1405.3531, 2014.

J. Nath Kundu et al., "Adadepth: Unsupervised content congruent adaptation for depth estimation," in Proceedings of the IEEE Conference on Computer Vision and Pattern Recognition, 2018, pp. 2656-2665.

D. Eigen and R. Fergus, "Predicting depth, surface normals and semantic labels with a common multi-scale convolutional architecture," in Proceedings of the IEEE international conference on computer vision, 2015, pp. 2650-2658.

Z. Hao et al., "Detail preserving depth estimation from a single image using attention guided networks," in 2018 International Conference on 3D Vision (3DV), 2018, pp. 304-313, IEEE.

L. Lixiong et al., "Efficient and high quality monocular depth estimation via gated multi-scale network," IEEE Access, vol. 8, Jan. 7, 2020, pp. 7709-7718.

A. Geiger et al., "Vision meets robotics: The kitti dataset," The International Journal of Robotics Research, 2013, vol. 32, No. 11, pp. 1231-1237.

N. Silberman et al., "Indoor segmentation and support inference from rgbd images," in European conference on computer vision, 2012, pp. 746-760, Springer.

A. Paszke et al., "Automatic differentiation in pytorch", 31st Conference on Neural Information Processing Systems (NIPS 2017), 2017, Long Beach, CA, USA.

K. He et al., "Deep residual learning for image recognition," in Proceedings of the IEEE conference on computer vision and pattern recognition, 2016, pp. 770-778.

S. Xie et al., "Aggregated residual transformations for deep neural networks," in Proceedings of the IEEE conference on computer vision and pattern recognition, 2017, pp. 1492-1500.

Fangchang Ma et al., "Self-supervised Sparse-to-Dense: Self-supervised Depth Completion from LiDAR and Monocular Camera" arXiv preprint arXiv:1807.00275, Jul. 3, 2018.

Isola, P et al., "Image-to-image translation with conditional adversarial networks", in Proceedings of the IEEE conference on computer vision and pattern recognition, 2017, pp. 1125-1134.

Yu, F., & Koltun, V, "Multi-scale context aggregation by dilated convolutions", arXiv preprint arXiv:1511.07122, 2015.

Chen, L. C et al., "Encoder-decoder with atrous separable convolution for semantic image segmentation", in Proceedings of the European conference on computer vision (ECCV), 2018, pp. 801-818.

* cited by examiner

DEVICE FOR GENERATING A DEPTH MAP

CROSS-REFERENCE TO RELATED APPLICATION

The present application claims priority under 35 U.S.C. § 119(a) to Korean Patent Application No. 10-2020-0092085, filed on Jul. 24, 2020, which are incorporated herein by reference in its entirety.

BACKGROUND

1. Technical Field

Various embodiments may relate to a device for generating a depth map from a camera image without using an expensive sensor such as a Light Detection and Ranging (LiDAR) sensor.

2. Related Art

In order to realize an autonomous vehicle of level 4 or higher, an algorithm for estimating, segmenting, and detecting a distance to an object in front is essential.

In a conventional autonomous vehicle, it is inevitable to use a LiDAR sensor to obtain high-quality distance information, but the use of expensive equipment such as a LiDAR sensor has made it difficult to popularize the autonomous vehicle.

Accordingly, a technology for measuring a distance without using an expensive sensor (e.g., a LiDAR sensor) is desirable.

SUMMARY

In accordance with an embodiment of the present disclosure, a device may include an encoder configured to generate a plurality of feature data by encoding an image; a bottleneck circuit configured to generate enhanced feature data from first bottleneck data among the plurality of feature data; and a decoder configured to generate a depth map corresponding to the image by decoding the enhanced feature data and the plurality of feature data except the first bottleneck data.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed novelty, and explain various principles and beneficial aspects of those embodiments.

DETAILED DESCRIPTION

Various embodiments will be described below with reference to the accompanying figures. Embodiments are provided for illustrative purposes and other embodiments that are not explicitly illustrated or described are possible. Further, modifications can be made to embodiments of the present disclosure that will be described below in detail.

Figure 1:
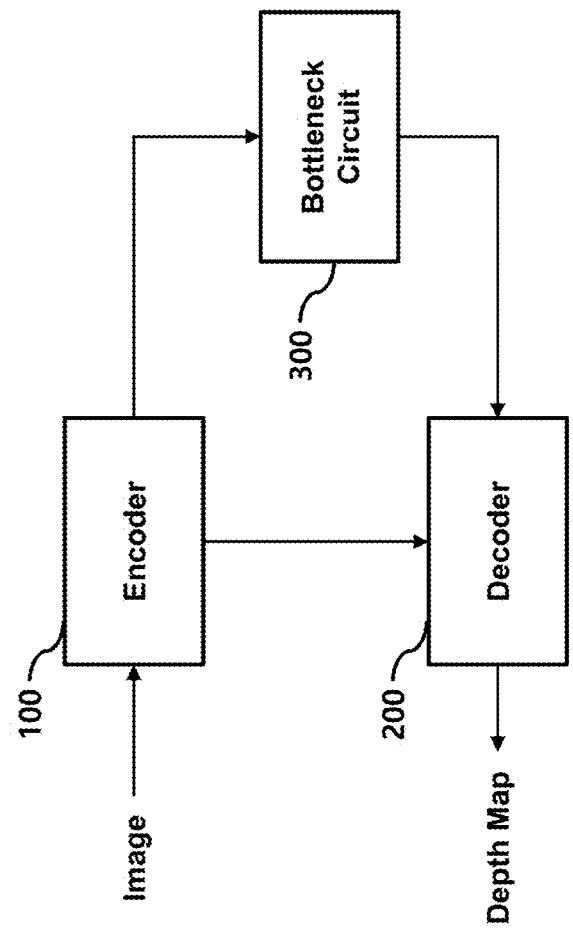
FIG. 1 illustrates a device for generating a depth map according to an embodiment of the present disclosure.

FIG. 1 is a block diagram showing a device 10a for generating a depth map according to an embodiment of the present invention.

A device for generating a depth map according to an embodiment of the present disclosure generates a depth map including distance information from an input image provided from a camera without using a sensor such as a LiDAR sensor that directly measures distance information. For example, the camera providing the input image may be an RGB camera installed at a front portion of an autonomous vehicle.

In this embodiment, the device 10a for generating a depth map includes an encoder 100, a decoder 200, and a bottleneck circuit 300.

The encoder 100 generates feature data from the input image.

The feature data provided by the encoder 100 includes a plurality of feature data having different scales, some of which (e.g., first to fourth feature data shown in FIG. 3) are provided to the decoder 200 and the rest (e.g., fifth feature data shown in FIG. 3) to the bottleneck circuit 300.

The bottleneck circuit 300 generates enhanced feature data by filtering feature data provided by the encoder 100 and provides the enhanced feature data to the decoder 200.

The decoder 200 generates a depth map using the feature data provided from the encoder 100 and the enhanced feature data provided from the bottleneck circuit 300.

Figure 2:
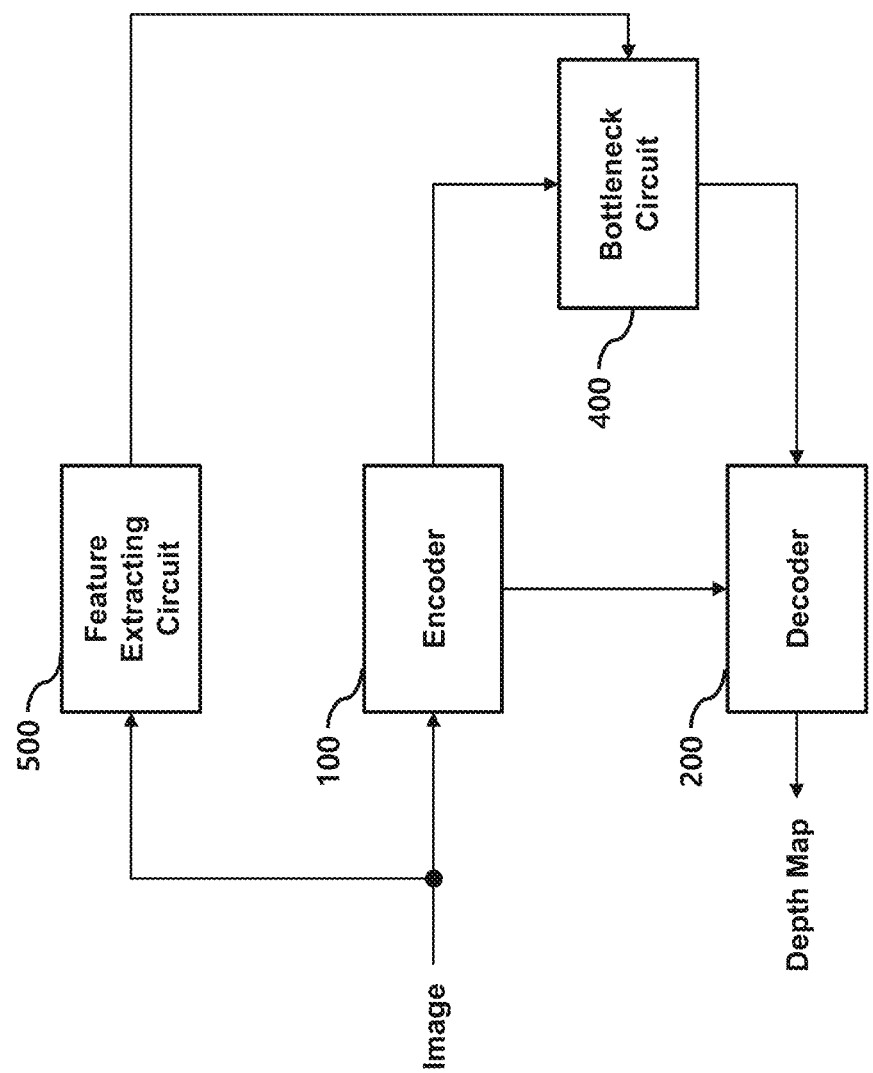
FIG. 2 illustrates a device for generating a depth map according to another embodiment of the present disclosure.

FIG. 2 is a block diagram showing a device 10b for generating a depth map according to another embodiment of the present disclosure.

The device 10b of FIG. 2 further includes a feature extracting circuit 500 for extracting feature data from an input image, and feature data extracted by the feature extracting circuit 500 is additionally provided to the bottleneck circuit 400.

At this time, the bottleneck circuit 400 generates enhanced feature data using feature data provided from the encoder 100 and feature data provided from the feature extracting circuit 500.

Hereinafter, detailed configurations of the encoder 100, the decoder 200, and the bottleneck circuits 300 and 400 will be described.

Figure 3:
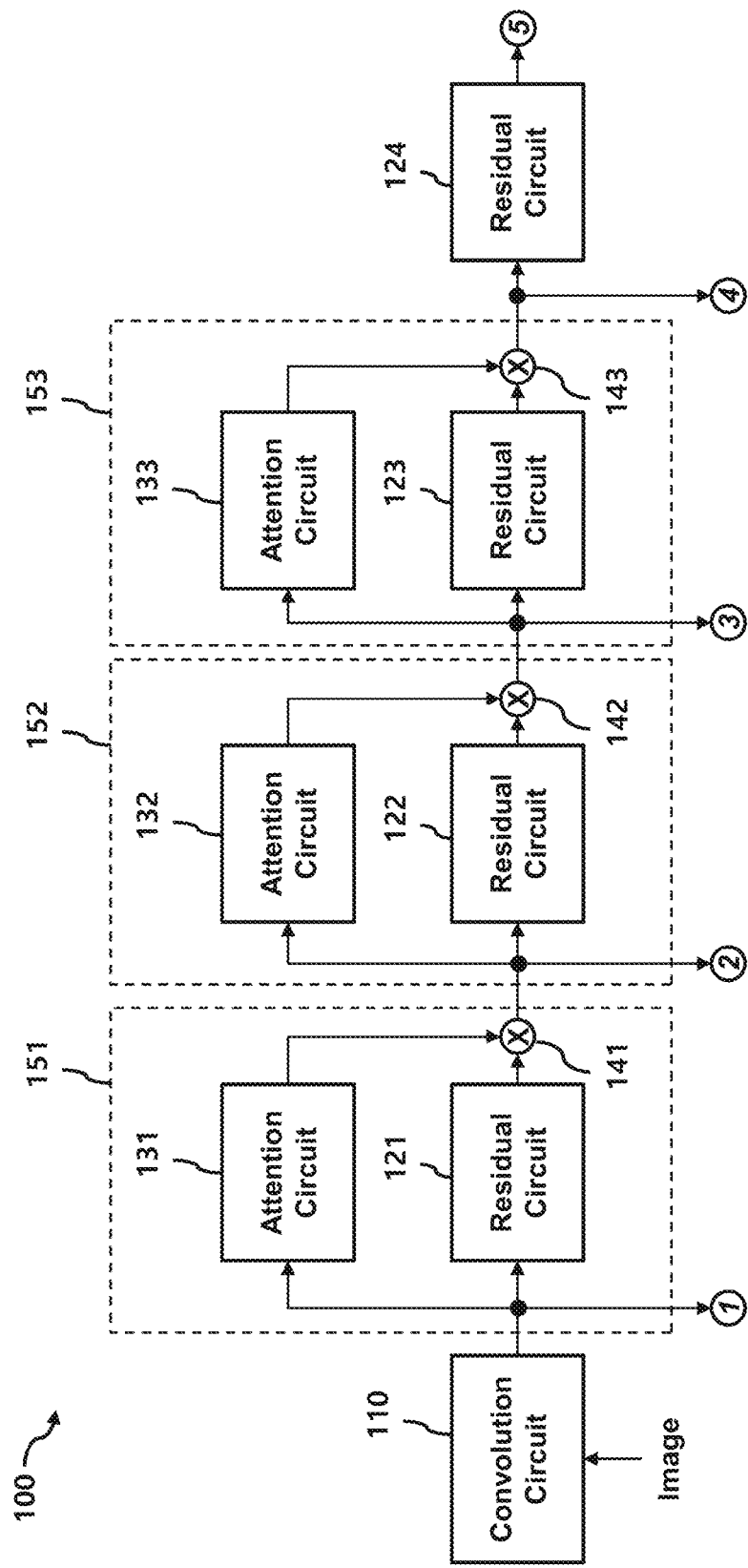
FIG. 3 illustrates an encoder according to an embodiment of the present disclosure.

FIG. 3 is a block diagram showing an encoder 100 according to an embodiment of the present disclosure.

The encoder 100 may include a neural network including a plurality of layers.

In this embodiment, the encoder 100 includes a convolution circuit 110 and a plurality of residual circuits 121 to 124.

In the embodiment of FIG. 3, the encoder 100 further includes a plurality of attention circuits 131 to 133 arranged in parallel to the plurality of residual circuits 121 to 124. For example, a first attention circuit 131 is coupled to a first residual circuits 121 in parallel, a second attention circuit 132 is coupled to a second residual circuit 122 in parallel, and a third attention circuit 133 is coupled to a third residual circuit 123 in parallel.

In the embodiment of FIG. 3, the encoder 100 further includes a plurality of first operation circuits 141 to 143.

The convolution circuit 110, the residual circuits 121 to 124, and the attention circuits 131 to 133 included in the encoder 100 perform an operation of extracting feature data from the input data.

For example, each of plurality of the attention circuits 131 to 133 extracts feature data from corresponding input data by focusing on a portion to be more noteworthy.

The convolution circuit 110 outputs first feature data by performing a convolution operation on the input image.

The first residual circuit 121 and the first attention circuit 131 each receive the first feature data and perform an operation on the received first feature data.

A first one 141 of the first operation circuits 141 to 143 receives the outputs of the residual circuit 121 and the attention circuit 131, performs an operation, and outputs the operation result as second feature data. For example, the operation performed by the first one 141 of the first operation circuits 141 to 143 may include a matrix multiplication operation.

The second residual circuit 122 and the second attention circuit 132 each receive the second feature data and perform an operation on the received second feature data.

A second one 141 of the first operation circuits 141 to 143 receives the outputs of the second residual circuit 122 and the second attention circuit 132, performs an operation, and outputs the operation result as third feature data. For example, the operation performed by the second one 142 of the first operation circuits 141 to 143 may include a matrix multiplication operation.

The third residual circuit 123 and the third attention circuit 133 each receive third feature data and perform an operation on the received third feature data.

A third one 143 of the first operation circuits 141 to 143 receives the outputs of the third residual circuit 123 and the third attention circuit 133, performs an operation, and outputs the operation result as fourth feature data. For example, the operation performed by the third one 143 of the first operation circuits 141 to 143 may include a matrix multiplication operation.

A fourth residual circuit 124 receives the fourth feature data, performs an operation on the received fourth feature data, and outputs the operation result as fifth feature data.

The first to fourth feature data is provided to the decoder 200 and the fifth feature data is provided to the bottleneck circuits 300 and 400.

The first residual circuit 121, the first attention circuit 131, and the first one 141 of the first operation circuits 141 to 143 may be referred to as a first unit encoder circuit 151.

Similarly, the second residual circuit 122, the second attention circuit 132, and the second one 142 of the first operation circuits 141 to 143 may be referred to as a second unit encoder circuit 152. The second unit encoder circuit 152 is coupled to the first unit encoder circuit 151 in series.

Similarly, the third residual circuit 123, the third attention circuit 133, and the third one 143 of the first operation circuits 141 to 143 may be referred to as a third unit encoder circuit 153. The third unit encoder circuit 153 is coupled to the second unit encoder circuit 152 in series.

In the embodiment of FIG. 3, the encoder 100 includes three unit encoder circuits 151 to 153, but the number of unit encoder circuits may vary according to embodiments. The number of feature data output from the encoder 100 and provided to the decoder 200 may vary according to the number of unit encoder circuits.

In an embodiment, the first feature data has 32 channels, the second feature data has 64 channels, the third feature data has 128 channels, the fourth feature data has 256 channels, and the fifth feature data has 512 channels.

As known in the field of neural network circuits, a channel can be understood as an image or a matrix plane.

In an embodiment, the size of the image decreases by ½ horizontally and ½ vertically when the image passes through each block, while the number of images or matrix planes increases. For example, when each of the first to fourth residual circuits 121 to 124 receives a first number of images each having a first size and outputs a second number of images each having a second size, the second size may decrease to a given size (e.g., a fourth of the first size), whereas the second number may increase to a given number (e.g., 2 times as great as the first number).

Accordingly, the first to fifth feature data may be collectively referred to as multi-scale feature data.

Figure 4:
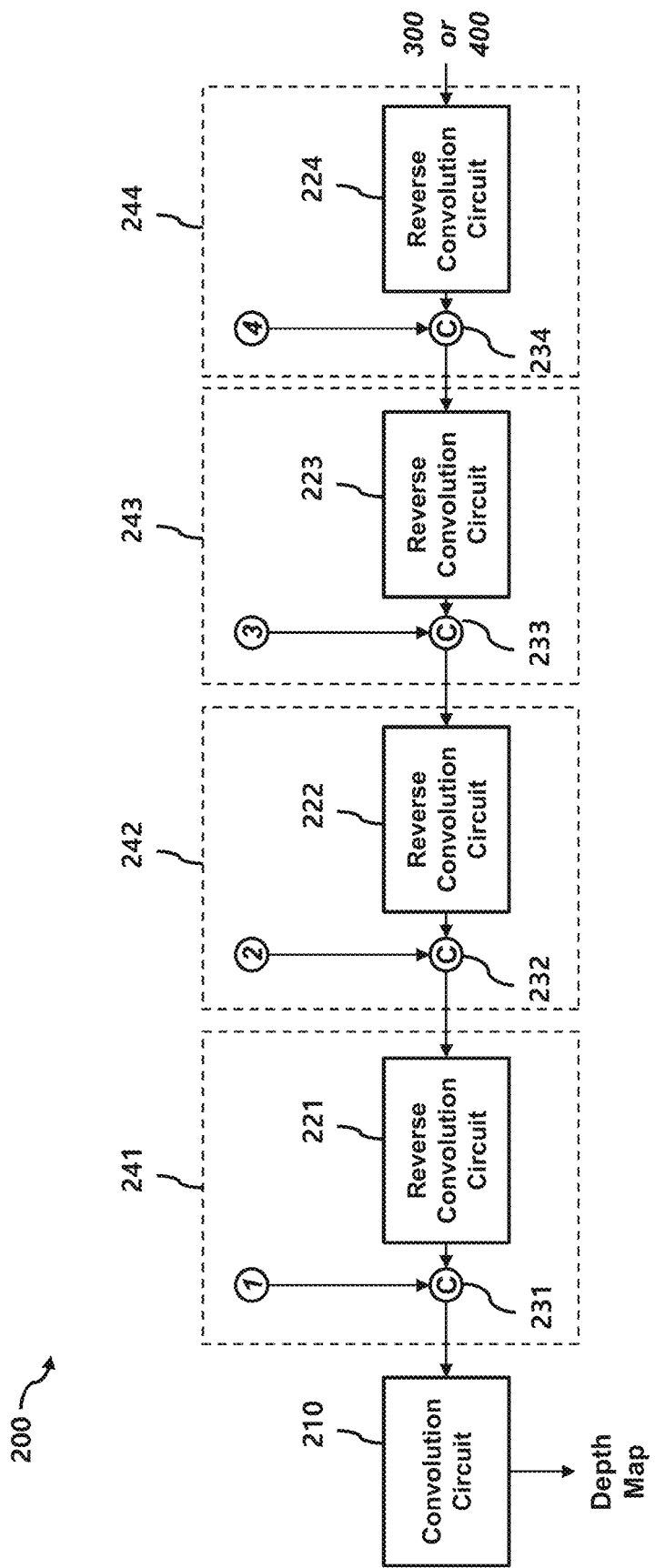
FIG. 4 illustrates a decoder according to an embodiment of the present disclosure.

FIG. 4 is a block diagram showing a decoder 200 according to an embodiment of the present disclosure.

The decoder 200 includes a convolution circuit 210 and a plurality of reverse convolution circuits 221 to 224.

In the embodiment of FIG. 4, the decoder 200 further includes a plurality of second operation circuits 231 to 234.

The convolution circuit 210 and the reverse convolution circuits 221 to 224 included in the decoder 200 perform a convolution operation or a reverse convolution operation to generate the depth map from the first to fourth feature data and the enhanced feature data provided from the bottleneck circuits 300 and 400.

Since the reverse convolution operation corresponds to an inverse operation of the convolution operation and is known in the field of neural network circuits, a detailed description thereof is omitted for the interest of brevity.

The convolution circuit 210 receives information output from a first one 231 of the second operation circuits 231 to 234 and performs a convolution operation to generate a depth map.

The first one 231 of the second operation circuits 231 to 234 performs an operation on the first feature data and output of the reverse convolution circuit 221. For example, the first one 231 of the second operation circuits 231 to 234 may perform a concatenation operation.

A first reverse convolution circuit 221 receives information output from a second one 232 of the second operation circuits 231 to 234 and performs a reverse convolution operation.

The second one 232 of the second operation circuits 231 to 234 performs an operation on the second feature data and output of a second reverse convolution circuit 222. For example, the second one 232 of the second operation circuits 231 to 234 may perform a concatenation operation.

The second reverse convolution circuit 222 receives information output from a third one 233 of the second operation circuits 231 to 234 and performs a reverse convolution operation.

The third one 233 of the second operation circuits 231 to 234 performs an operation on the third feature data and the output of a third reverse convolution circuit 223. For example, the third one 233 of the second operation circuits 231 to 234 may perform a concatenation operation.

The third reverse convolution circuit 223 receives information output from a fourth one 234 of the second operation circuits 231 to 234 and performs a reverse convolution operation.

The fourth one 234 of the second operation circuits 231 to 234 performs an operation on the fourth feature data and the output of a fourth reverse convolution circuit 224. For example, the fourth one 234 of the second operation circuits 231 to 234 may perform a concatenation operation.

The fourth reverse convolution circuit 224 performs a reverse convolution operation on the enhanced feature data output from the bottleneck circuits 300 in FIG. 1 or 400 in FIG. 2.

In the above, the first reverse convolution circuit 221 and the first one 231 of the second operation circuits 231 to 234 may be referred to as a first unit decoder circuit 241.

Similarly, the second reverse convolution circuit 222 and the second one 232 of the second operation circuits 231 to 234 may be referred to as a second unit decoder circuit 242.

Similarly, the third reverse convolution circuit 223 and the third one 233 of the second operation circuits 231 to 234 may be referred to as a third unit decoder circuit 243.

Similarly, the fourth inverse convolution circuit 224 and the fourth one 234 of the second operation circuits 231 to 234 may be referred to as a fourth unit decoder circuit 244.

In the embodiment of FIG. 4, the decoder 200 includes four unit decoder circuits, but the number of the unit decoder circuits may vary according to embodiments.

In an embodiment, the number of unit decoder circuits may vary according to the number of feature data output from the encoder 100 and provided to the decoder 200. For example, the number of unit decoder circuits may be equal to the number of feature data output from the encoder 100 and provided to the decoder 200.

In an embodiment, the size of the image increases and the number of corresponding images or matrix planes decreases as they are passed through each block of the decoder 200.

Finally, when passing through the convolution circuit 210, a depth map is generated. The depth map has the same size as the input image and includes distance information of one channel.

Figure 5:
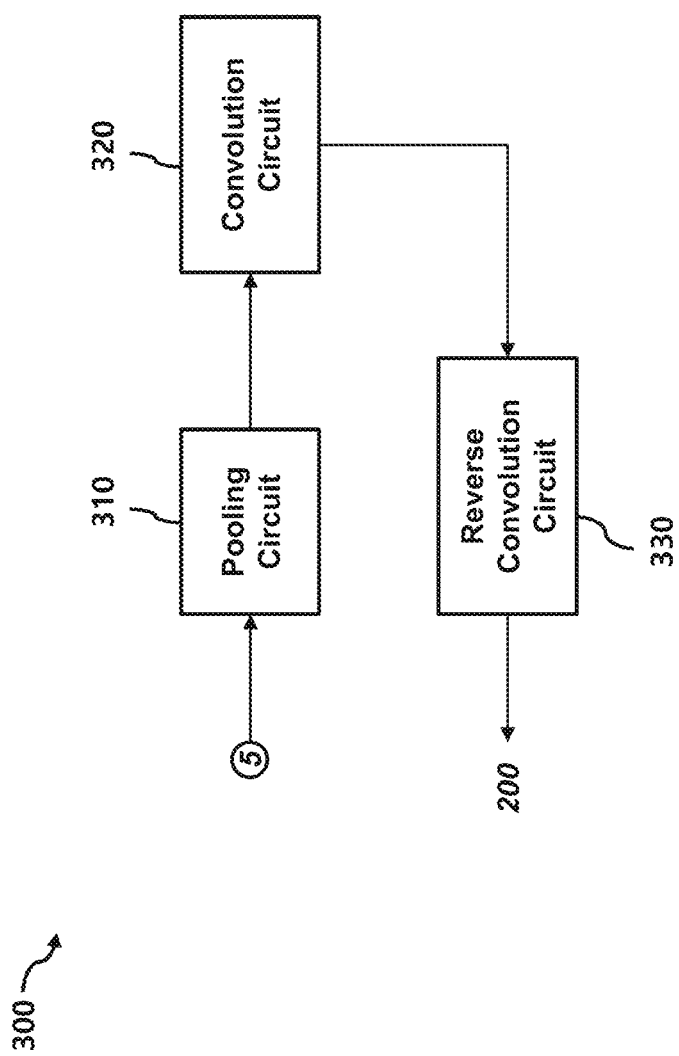
FIG. 5 illustrates a bottleneck circuit according to an embodiment of the present disclosure.

FIG. 5 is a block diagram showing a bottleneck circuit 300 according to an embodiment of the present disclosure.

The bottleneck circuit 300 outputs enhanced feature data by using the fifth feature data output from the encoder 100.

The fifth feature data output from the encoder 100 may be referred to as bottleneck data.

The bottleneck data is finally generated by the encoder 100 and includes feature data of the highest level.

The bottleneck circuit 300 includes a pooling circuit 310, a convolution circuit 320, and a reverse convolution circuit 330.

The pooling circuit 310 receives bottleneck data and performs a pooling operation to add context information to feature data.

The pooling circuit 310 may include an Atrous Spatial Pyramid Pooling (ASPP) circuit.

For the data output from the pooling circuit 310, the convolution circuit 320 and the reverse convolution circuit 330 respectively perform a convolution operation and a reverse convolution operation, and as a result, output enhanced feature data.

Figure 6:
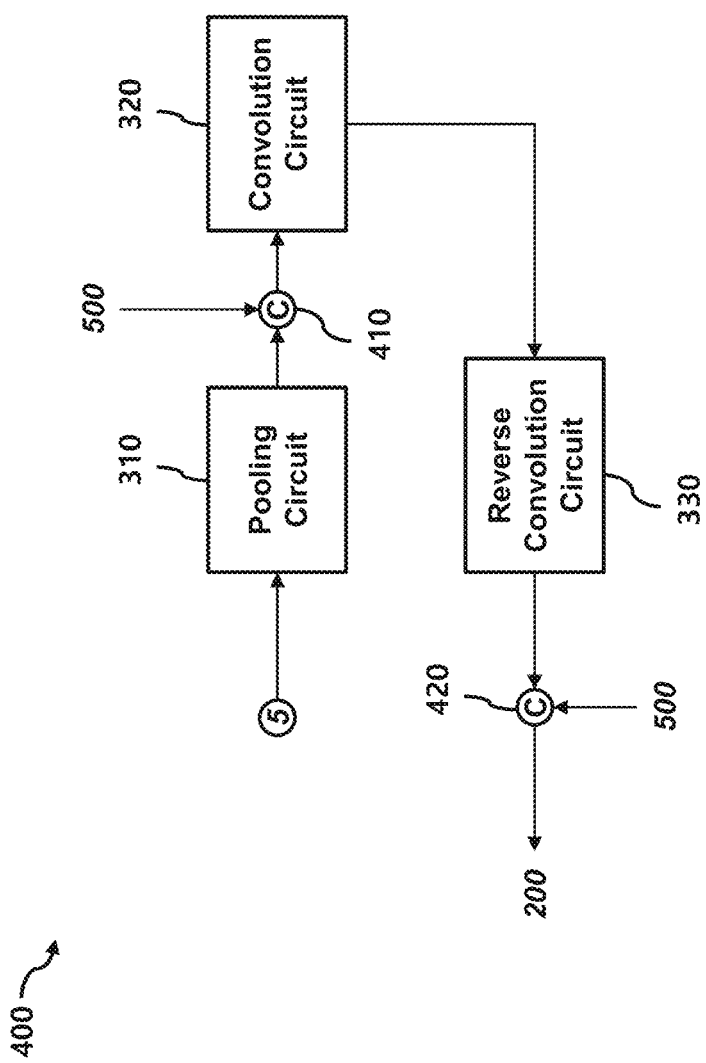
FIG. 6 illustrates a bottleneck circuit according to another embodiment of the present disclosure.

FIG. 6 is a block diagram showing a bottleneck circuit 400 according to an embodiment of the present disclosure.

The device 10b for generating a depth map in FIG. 2 further includes a feature extracting circuit 500 for additionally generating feature data from the input image.

The feature extracting circuit 500 may include a neural network circuit. For example, the neural network circuit may be a residual network trained using a dataset such as ImageNet.

ImageNet is a data set including hundreds of thousands or more of images of various objects, and can further supplement the enhanced feature data by additionally using features extracted from the trained neural network circuit using this.

Hereinafter, the fifth feature data output from the encoder 100 may be referred to as bottleneck data or first bottleneck data, and the feature data output from the feature extracting circuit 500 may be referred to as second bottleneck data.

The bottleneck circuit 400 includes a pooling circuit 310, a convolution circuit 320, and a reverse convolution circuit 330.

The bottleneck circuit 400 further includes third operation circuits 410 and 420.

Since the pooling circuit 310 is the same as that disclosed in FIG. 5, a detailed description thereof will be omitted for the interest of brevity.

The convolutional circuit 320 and the reverse convolutional circuit 330 sequentially perform a convolution operation and a reverse convolution operation on the output of a first one 410 of the third operation circuits 410 and 420.

The first one 410 of the third operation circuits 410 and 420 performs an operation on the second bottleneck data provided from the feature extracting circuit 500 and the output of the pooling circuit 310 and provides the operation result to the convolution circuit 320. At this time, the operation circuit 410 may perform a concatenation operation.

A second one 420 of the third operation circuits 410 and 420 calculates the output of the reverse convolution circuit 330 and the second bottleneck data to output enhanced feature data. In this case, the operation circuit 420 may perform a concatenation operation. By concatenating feature data generated with the input image by the feature extracting circuit 500 at the third operation circuits 410 and 420, the enhanced feature data output from the bottleneck circuit 400 may include stronger information than that output from the bottleneck circuit 300.

In FIG. 6, the bottleneck circuit 400 includes two third operation circuits, but may include only one of the two depending on embodiments.

For example, when the third operation circuit 410 is not included, the convolution circuit 320 may perform a convolution operation on the output of the pooling circuit 310.

For example, when the third operation circuit 420 is not included, the output of the reverse convolution circuit 330 may be provided as enhanced feature data.

The device for generating a depth map according to an embodiment of the present disclosure generates a depth map from an input image and performs a training operation in a direction to reduce an error between the generated depth map and an actual depth map.

In an embodiment, a mean squared error (MSE) is used as an indicator, but other indicators may be used depending on embodiments.

Various training process including those known in the field of neural network circuits may be used to reduce an error between the generated depth map and the actual depth map.

Figure 7:
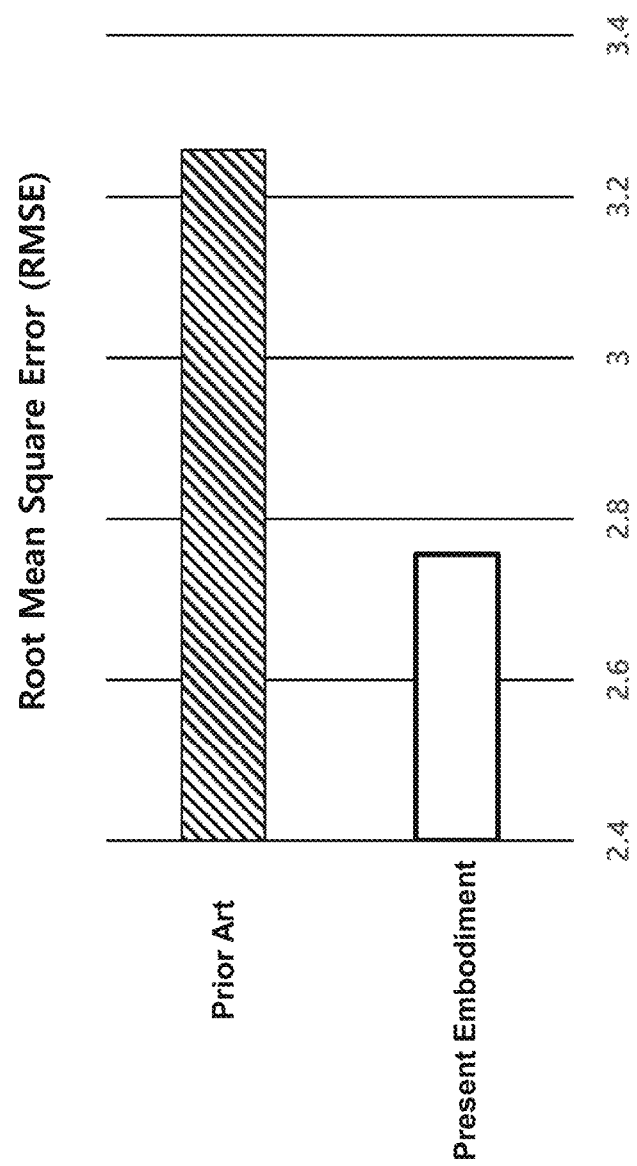
FIG. 7 illustrates beneficial aspects of a device for generating a depth map according to an embodiment of the present disclosure.

FIG. 7 is a graph showing beneficial aspects of a device for generating a depth map according to an embodiment of the present disclosure.

In FIG. 7, root mean square error (RMSE) graphs of a conventional device and a device for generating a depth map according to an embodiment of the present disclosure are shown.

Smaller RMSE represents better performance. The RMSE value is measured to be 3.258 in the prior art and 2.756 in the present embodiment, and this shows improvement of performance by about 15% compared to the prior art.

In an embodiment, a method for controlling a device for generating a depth map includes generating a plurality of feature data by encoding an image, the plurality of feature data including first bottleneck data, generating enhanced feature data from the first bottleneck data, and generating a depth map corresponding to the image by decoding the enhanced feature data and the plurality of feature data except the first bottleneck data.

In an embodiment, the method further includes generating second bottleneck data by extracting feature from the image. The enhanced feature data is generated based on the first bottleneck data and the second bottleneck data.

In an embodiment, generating the enhanced feature data includes performing a pooling operation on the first bottleneck data, performing a first concatenation operation on a result of the pooling operation and the second bottleneck data, performing a convolution operation on a result of the first concatenation operation, performing a reverse convolution operation on a result of the convolution operation, and performing a second concatenation operation on a result of the reverse convolution operation and the second bottleneck data.

Although various embodiments have been described for illustrative purposes, various changes and modifications may be possible.

What is claimed is:

1. A device comprising:
an encoder configured to generate a plurality of feature data by encoding an image;
a bottleneck circuit configured to generate enhanced feature data from first bottleneck data among the plurality of feature data; and
a decoder configured to generate a depth map corresponding to the image by decoding the enhanced feature data and the plurality of feature data except the first bottleneck data.

2. The device of claim 1, wherein the encoder comprises:
a convolution circuit configured to perform a convolution operation on the image;
a plurality of unit encoder circuits coupled in series, a first one of the plurality of unit encoder circuits being coupled to the convolution circuit; and
a first residual circuit coupled to a last one of the unit encoder circuits,
wherein the convolution circuit, the plurality of unit encoder circuits, and the first residual circuit output the plurality of feature data, respectively.

3. The device of claim 2, wherein one or more of the plurality of unit encoder circuits each comprise:
a second residual circuit receiving a first one of the plurality of feature data;
an attention circuit coupled in parallel to the second residual circuit; and
a first operation circuit configured to generate a second one of the plurality of feature data by performing an operation on outputs from the second residual circuit and the attention circuit.

4. The device of claim 3, wherein the first operation circuit performs a matrix multiplication operation.

5. The device of claim 2, wherein the first residual circuit outputs the first bottleneck data.

6. The device of claim 1, wherein the decoder includes:
a plurality of unit decoder circuits coupled in series and receiving the plurality of feature data and the enhanced feature data; and
a convolution circuit configured to generate the depth map corresponding to the image by performing a convolution operation on data output from one of the plurality of unit decoder circuits.

7. The device of claim 6, wherein the plurality of unit decoder circuits comprise a first unit decoder circuit and a second unit decoder circuit, the first unit decoder circuit being coupled to the second unit decoder circuit in series and receiving a first one of the plurality of feature data, the first unit decoder circuit comprising:
a reverse convolution circuit configured to perform a reverse convolution operation on an output of the second unit decoder circuit; and
a second operation circuit configured to perform an operation on the first one of the plurality of feature data and an output of the reverse convolution circuit.

8. The device of claim 7, wherein the second operation circuit performs a concatenation operation.

9. The device of claim 6, wherein the plurality of unit decoder circuits comprises a unit decoder circuit receiving a corresponding one of the plurality of feature data, the unit decoder circuit comprising:
a reverse convolution circuit configured to perform a reverse convolution operation on the enhanced feature data; and
a second operation circuit configured to perform an operation on the received one of the plurality of feature data and an output of the reverse convolution circuit.

10. The device of claim 1, wherein the bottleneck circuit comprises:
a pooling circuit configured to perform a pooling operation on the first bottleneck data;
a convolution circuit configured to perform a convolution operation on an output of the pooling circuit; and
a reverse convolution circuit configured to perform a reverse convolution circuit on an output of the convolution circuit to output the enhanced feature data.

11. The device of claim 10, wherein the pooling circuit includes an Atrous Spatial Pyramid Pooling (ASPP) circuit.

12. The device of claim 1, further comprising a feature extracting circuit configured to generate second bottleneck data by extracting feature from the image,
wherein the bottleneck circuit generates the enhanced feature data by using the first bottleneck data and the second bottleneck data.

13. The device of claim 12, wherein the bottleneck circuit comprises:
a pooling circuit configured to perform a pooling operation on the first bottleneck data;
a third operation circuit configured to perform an operation on an output of the pooling circuit and the second bottleneck data;
a convolution circuit configured to perform a convolution operation on an output of the third operation circuit; and
a reverse convolution circuit configured to perform a reverse convolution operation on an output of the convolution circuit.

14. The device of claim 13, further comprising a fourth operation circuit configured to perform an operation on an output of the reverse convolution circuit and the second bottleneck data to output the enhanced feature data.

15. The device of claim 13, wherein the third operation circuit performs a concatenation operation on the output of the pooling circuit and the second bottleneck data.

16. The device of claim 12, wherein the bottleneck circuit comprises:
 a pooling circuit configured to perform a pooling operation on the first bottleneck data;
 a convolution circuit configured to perform a convolution operation on an output of the pooling circuit;
 a reverse convolution circuit configured to perform a reverse convolution operation on an output of the convolution circuit; and
 a third operation circuit configured to perform an operation on an output of the reverse convolution circuit and the second bottleneck data to output the enhanced feature data.

17. The device of claim 16, further comprising a fourth operation circuit configured to perform an operation on the output of the pooling circuit and the second bottleneck data, and to provide an output thereof to the convolution circuit.

18. A method comprising:
 generating a plurality of feature data by encoding an image, the plurality of feature data including first bottleneck data;
 generating enhanced feature data from the first bottleneck data; and
 generating a depth map corresponding to the image by decoding the enhanced feature data and the plurality of feature data except the first bottleneck data.

19. The method of claim 18, further comprising:
 generating second bottleneck data by extracting feature from the image,
 wherein the enhanced feature data is generated based on the first bottleneck data and the second bottleneck data.

20. The method of claim 19, wherein generating the enhanced feature data comprises:
 performing a pooling operation on the first bottleneck data;
 performing a first concatenation operation on a result of the pooling operation and the second bottleneck data;
 performing a convolution operation on a result of the first concatenation operation;
 performing a reverse convolution operation on a result of the convolution operation; and
 performing a second concatenation operation on a result of the reverse convolution operation and the second bottleneck data.

* * * * *